(12) United States Patent
Gootter et al.

(10) Patent No.: US 6,942,290 B1
(45) Date of Patent: Sep. 13, 2005

(54) QUICK-MOUNT AND PIVOT BASE FOR BICYCLE SEAT OR THE LIKE

(75) Inventors: Steven M. Gootter, Scottsdale, AZ (US); Thomas D. Williams, San Diego, CA (US)

(73) Assignee: G & W Products, Inc., San Diego, CA (US)

( * ) Notice: Subject to any disclaimer, the term of this patent is extended or adjusted under 35 U.S.C. 154(b) by 0 days.

(21) Appl. No.: 09/668,042

(22) Filed: Sep. 21, 2000

(51) Int. Cl.[7] .................................................. B62J 1/00
(52) U.S. Cl. ................................... 297/195.1; 297/209
(58) Field of Search ........................... 297/195.1, 209, 297/213, 215.15, 314

(56) References Cited

U.S. PATENT DOCUMENTS

| | | | | |
|---|---|---|---|---|
| 468,398 | A | * | 2/1892 | Sherman ................. 297/213 |
| 2,859,799 | A | | 11/1958 | Moore |
| 4,772,069 | A | * | 9/1988 | Szymski ............... 297/215.14 |
| 4,836,604 | A | * | 6/1989 | Romano ............... 297/215.14 |
| 4,978,167 | A | | 12/1990 | Harvey |
| 5,226,624 | A | | 7/1993 | Kingsbery |
| 5,228,796 | A | * | 7/1993 | Kao ........................... 403/84 |
| 5,286,082 | A | * | 2/1994 | Hanson .................... 297/201 |
| 5,295,727 | A | * | 3/1994 | Kao ..................... 297/215.14 |
| 5,383,706 | A | | 1/1995 | Chen |
| 5,441,327 | A | * | 8/1995 | Sanderson ............... 297/195.1 |
| 5,466,042 | A | | 11/1995 | Herman |
| 5,547,155 | A | | 8/1996 | Herting |
| 5,622,412 | A | * | 4/1997 | Yamane .................. 301/124.2 |
| 5,775,710 | A | * | 7/1998 | Yu ............................. 280/283 |
| 5,915,784 | A | | 6/1999 | Clark |
| 5,921,696 | A | | 7/1999 | Gillotti |
| 6,174,027 | B1 | * | 1/2001 | Lemmens .............. 297/215.15 |
| 6,183,043 | B1 | * | 2/2001 | Nelson ..................... 297/201 |
| 6,213,553 | B1 | * | 4/2001 | Fitz ........................... 297/314 |

FOREIGN PATENT DOCUMENTS

DE          19547964 A1  *  6/1997

* cited by examiner

*Primary Examiner*—Peter M. Cuomo
*Assistant Examiner*—Joseph Edell
(74) *Attorney, Agent, or Firm*—Duckor Spradling Metzger & Wynne; Bernard L. Kleinke

(57) ABSTRACT

A seat support platform is pivotally supported on a base member. A rotatable locking element is provided on the platform to selectively lock frame members of a saddle thereonto. The base is adapted to be mounted to a support frame/chassis such as that of a stationary bicycle or the like. A resilient biasing arrangement enables the saddle to move from side to side relative to the base member to enable a user to sway from side to side in a more natural manner when riding on the saddle.

3 Claims, 6 Drawing Sheets

QUICK-MOUNT AND PIVOT BASE FOR BICYCLE SEAT OR THE LIKE

BACKGROUND OF THE INVENTION

1. Field of the Invention

The present invention relates generally to seat mounting arrangement and more specifically to a quick action mount arrangement which permits seats/saddles to be switched from one to another with the minimum of trouble and effort.

2. Related Art

With stationary exercise bikes such as those found in gymnasiums, a problem has been encountered in that the very exercise that the machines are designed to produce, leads the drawback that the person by exercising, sweats, usually profusely. This leads to the situation wherein in the event that a number of different people use the same machine, the saddle or seat of that machine tends to become contaminated with sweat and/or bacteria contained in the sweat, and thus can lead to a possible hygiene problem as time passes by and different people continue to use the same machine.

One method of overcoming this is to provide the seat with a removable washable/disposable cover. However, such covers apt to slip about, as they stretch and/or otherwise deform with the passing of time. Another method is to change the seat each time a different person wishes to exercise. However, this usually involves the use of a spanner to release a nut and to allow the seat to switched out. The loss of the spanner, of course is apt to occur, thus leading to frustration and annoyance especially when the user has his or her own saddle which is particularly adapted to the person's physique, shape/preference.

Moreover, comfort is also an issue. There are individual preferences as to the type of seat, such as size and configuration. The seats typically used on stationary bikes in a gymnasium, are low cost seats, which are generally uncomfortable to use, and not as desirable to use as a person's own bicycle seat.

Furthermore, such conventional seats are stiff, and produce unwanted jarring of the joints of the user during use, due to the stiff seat and fixed position of the bike. Thus, more impact is experienced on a stationary bike as compared to a conventional road bike.

SUMMARY OF THE INVENTION

The present invention is directed to solving problem alluded to above, by providing an arrangement which permits seats to be quickly and easily unlocked, removed and replaced with another, and then permits the new seat to be quickly and easily locked in position ready for use. In addition to this, quick and easy switching of seats the invention further features a quick and easy orientation adjustment (e.g. pitch adjustment) which allows the angle of the saddle to be adjusted to an angle with respect to the floor/bike which is preferred by the user.

Yet another feature of the invention resides in an arrangement which resiliently supports the saddle or seat mounting arrangement and allows both the top half of the mount and the saddle to rock from side to side in a manner which emulates given types of riding style.

In brief, the above features are achieved by an embodiment wherein a seat support platform is provided with recesses that are adapted to receive elongate members which form part of most commonly used saddle chassis/frames and which extend along the bottom thereof. Once placed in these recesses, the elongate members can be locked in position using a rotatable locking element.

In addition to the above, the platform is pivotally supported on shafts or pivots and resiliently connected to a base member through a plurality of springs or the like type of resilient biasing elements. These spring are selected to produce sufficient bias/resistance to limit the amount of rocking motion the seat may undergo to a suitable narrow angle.

The base member, in this embodiment, is provided with clamp members which have arcuate surfaces that are provided with splines, teeth, knurling or the like, and which can be selectively forced into locking engagement through the use of a suitable lever operated device. In the disclosed embodiment, this lever operated device takes the form of a "cam" lever which is provided with a cam surface that causes the arcuate surfaces to assume a locking or clamped engagement when it is rotated to a locking position. When rotated away from this position, sufficient play is permitted between the surfaces of the clamp members to permit manual manipulation of the relative positions of the surfaces and thus allow the angle of the base member with respect to a device (e.g. a stationary bicycle) to be adjusted to a desired orientation.

More specifically, a first aspect of the present invention resides in a quick release/connection arrangement for a seat, comprising: a seat receiving structure having recessed portions adapted to receive a pair of elongate members which form part of a frame of the seat; a lever operated rotatable locking element is rotatably supported on the seat structure receiving member and selectively rotatable between a first position wherein engagement with the elongate members is absent and wherein the pair of elongate members are removable from the seat structure receiving member, and a second position wherein elongate members are engaged and locked in position on the seat structure receiving member.

This arrangement can further comprise: a base member on which the seat receiving structure is pivotally supported; and a resilient biasing arrangement which operatively interconnects the seat receiving structure with the base member and which biases the seat receiving structure to normally assume a predetermined orientation with respect to the base member.

Additionally, this arrangement can further include a clamp operatively interconnecting the base member and a chassis of a device, the clamp comprising: a first clamp member which is rigidly connected to the base member and a second clamp member which is rigidly connected with the chassis, a cam arrangement for normally forcing the first and second clamp members into locking engagement with each other and for selectively permitting sufficient play between the first and second clamp members to allow the relative movement therebetween.

This cam arrangement can comprise a lever which is rotatably supported on a shaft that is disposed through apertures respectively formed the first and second clamp members and which is operatively connected with the first clamp member. The lever in this case having a cam surface formed thereon proximate an axis about which the lever is rotatable with respect to the shaft. This cam surface is engageable with a surface which is stationary with respect to the second clamp member to produces a reaction which forces the first and second clamp members together into locking engagement with one another.

The above-mentioned seat receiving structure can comprise a platform in which the recessed portions are formed, and in which detents are provided to resist movement of the elongate members of the seat frame out of the passage structures with a predetermined amount of force.

A second aspect of the present invention resides in a quick release/connection arrangement for a seat comprising: a seat receiving platform which is pivotally supported on a base member; a resilient biasing member operatively interconnecting the platform and the base member to permit a limited amount of pivotal movement of the platform with respect to the base member; and a lever operated locking element mounted on the platform which is movable between a first position wherein a seat can be readily removed from the platform, and a position wherein the seat is immovably locked onto the platform.

In addition to the above, this arrangement can include a lever operated clamp which interconnects the base member and a chassis of a device operated locking element which is movable between a first position wherein a seat can be readily removed from the platform, and a position wherein the seat is immovably locked onto the platform.

A third aspect of the invention resides in a quick release/connection arrangement for a seat comprising: a seat receiving platform which is pivotally supported on a base member; a lever operated locking element mounted on the platform and movable between a first position wherein a seat can be readily removed from the platform, and a second position wherein the seat is immovably locked onto the platform; and a lever operated clamp which interconnects the base member and a chassis of a device.

Similar to the above-mentioned arrangements, the lever operated clamp can comprise: first and second clamp elements which are respectively rigidly connected with a base member and a chassis of a device; a shaft which passes through one of the first and second clamp elements and which is engageable with another of the first and second clamp elements; a lever operatively engaged with the shaft and arranged to be movable to a clamp position wherein it applies a force to the shaft and forces the first and second clamp elements into locking engagement with one another.

In this arrangement, the lever is formed with a cam surface which engages a predetermined surface when the lever is rotated to the clamp position, and which, through the engagement, displaces the shaft and forces the first clamp element into engagement with the second clamp element.

BRIEF DESCRIPTION OF THE DRAWINGS

The various features and advantages of the present invention will become more clearly appreciated as a detailed description of the preferred embodiment is given with reference to the appended drawings in which.

DETAILED DESCRIPTION OF THE PREFERRED EMBODIMENTS

Figure 1:
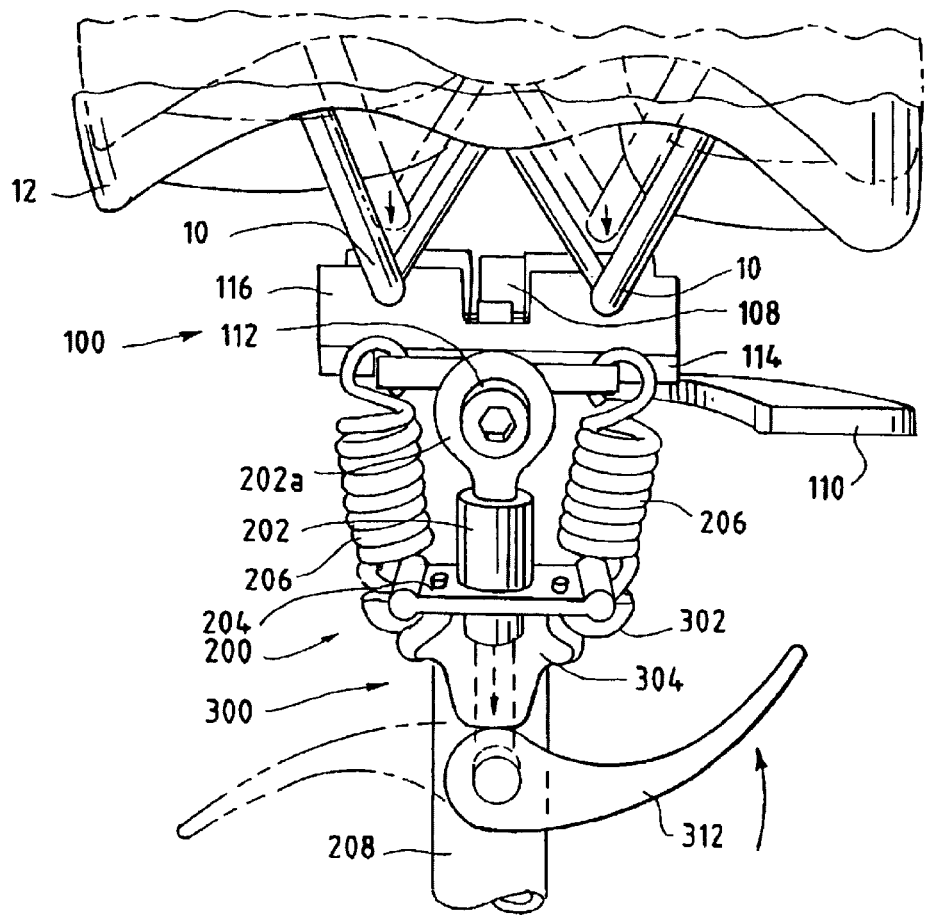
FIG. 1 is a rear view of an embodiment of the invention depicting the movement of an adjustment lever that enables quick unclamping and re-orientation of a seat support platform with respect to a frame such as that of a stationary exercise bicycle.

FIGS. 1–11 show an embodiment of the invention. In this arrangement, a seat support platform 100 is pivotally supported on shafts which are disposed through apertures formed in vertically extending post members 202 that form part of a base member generally denoted by the numeral 200. The base member 200 includes a clamp arrangement 300 which rigidly interconnects the base member 200 with a support frame such as that of a stationary bicycle or the like. In this arrangement, the clamp arrangement 200 includes upper and lower members 302, 304 which are adjustable with respect to one another to permit the orientation of the seat support platform 100 to be adjusted with respect to the support frame.

In more detail, the seat support platform 100 includes a structure which defines pairs of essentially parallel channels 102 that are adapted to receive essentially parallel portions 10 of a seat frame or chassis. These seat chassis/frame portions 10 are, as is conventional, formed of round spring steel stock or the like. Examples of such a structure are shown in U.S. Pat. No. 4,369,999 issued on Jan. 25, 1983 in the name of Kashima. The content of the document is hereby incorporated by reference.

In order to assist in maintaining a seat or saddle 12 in position once it is set on the platform 100, a plurality of detents 104 in the form of spring loaded dome-headed or caged ball bearing members, are disposed in pairs of opposed bores formed in crenellation-like projecting members 106 located on either side of the channels 102 in the illustrated manner. These detents 104 are arranged to project toward each other in pairs so as to engage the upper surface of the portions 10 of the seat frame once they are seated into the channels 102. The detents 104 retain the seat frame portions 10 in the channels 102 with a force selected to be easily overcome through the manual manipulation of the saddle 12. This retention is selected to ensure that the saddle 12, once disposed in position, remains there without any further particular intervention/care.

To rigidly lock the saddle 12 in position, a rotatable lock element 108 which shall be referred to as a 'lock-block', is rotatably supported on an upper surface of the platform 100 and connected to a lock lever 110 for synchronous movement therewith. This lock-block 108 is rotatable between a release position wherein it is essentially parallel with the seat frame members, and a locking position wherein it is rotated through 900 to a position wherein it engages at least part of the frame members 10 trapping the same in the channels 102. In this embodiment, the lock-block 108 is formed with curved recesses 108a at each end. These recess 108a are selected to match the curvature of the frame members 10 and to produce a snug locking engagement when the block 108 is rotated to the locking position via manual manipulation of the lock lever 110 from the position illustrated in FIG. 5 to that illustrated in FIG. 6.

As will be appreciated, the illustrated lock-block configuration enables a low platform profile. However, the present invention is not so limited and it is within the scope of the invention to use a differently shaped lock element if such is deemed preferable.

The platform 100 is pivotally supported on "pivot" bolts 112 which are threadedly received in boss or projection members (no numeral) forming part of a sub-plate member 114 that forms part of the platform 100 and which is securely bolted to the underside of an upper structural member 116 in which the channels 102 are formed. These bolts 112 pass through bores formed in circular bosses 202a at the tops of a pair of the post-like support members 202 which are bolted to a base platform 204 that forms a main portion of the base member. This base arm platform 204 is, in this instance, formed of a flat plate which has circular cross-section reinforcing beads provided along each side.

A pair of coil compression springs 206 operatively interconnect the sub-plate member 114 of the platform 100 which is bolted to the lower side of the upper structural member 116 in which the channels 102 are defined, with the flat plate structure of the base platform 204. This arrangement is such as to permit the platform 100 to rock from side to side relative to the base member through the angle θ depicted in FIG. 2. This pivotal movement is such as to permit the saddle 12 to move in a manner enables the emulation of the side-to-side swaying motion of a bicycle under heavy peddling. The springs 206 enable the user to sway from side to side in a natural manner, and thus reduces or eliminates unwanted jarring of joints or other parts of the body of the user. In this regard, the seat is able to move from side to side relative to the base member.

It will become apparent to those skilled in the art that tension springs, small shock absorbs or other suitable resilient biasing devices may be employed in place of the compression springs.

The lower portion of the base member 208 (best seen in FIG. 4) consists of a structure which is adapted to form part of, or be connected to, a support frame such as that of a stationary bicycle or the like. Although not specifically shown, this lower portion 208 can be provided with a structure that allows it to be clamped to the frame of the stationary bicycle or similar structure (not shown).

The clamp arrangement 300 which permits the adjustment of the pitch angle or orientation of the base 200 is such that the lower clamp member 304 has a curved concave surface provided with a plurality of straight teeth or splines 304a and is rigid with the lower portion 208, while the curved convex upper clamp member 302 which is provided with a plurality of corresponding teeth or splines 302a on its convexly curved surface. The upper and lower clamp members 302, 304 are arranged to engage one another and to be adjustably set in a number of different positions relative to one another. The upper clamp member 302 is held against a lower surface of the flat plate 204 by an arrangement which includes a clamp connection/tension bolt or shaft 306 which passes through apertures formed in both of the upper and lower clamp members 302, 304 and the flat plate 204. This clamp connection/tension bolt 306 also passes through apertures formed in arcuately shaped member 308 which is adapted to seat on the upper surface of the flat plate 204, and an elliptic prism-shaped member 310 which matingly seats in an arcuate groove 308a formed in the arcuately shaped member 308.

A nut and a washer 306a are provided at the upper end of the clamp connection/tension bolt 306 to provide a reaction arrangement. A cam lever 312, as it shall be referred to, is pivotally supported at the lower end of the bolt 306. The cam lever 312 is provided with a shoulder or cam surface 312a which projects in a manner wherein the lever 312, when rotated from a release position to a locking position, is such as to bring the shoulder or cam surface 312a into engagement with the lower surface of the lower clamp member 304 in a manner which draws the upper member 302 down into tight meshing engagement with the lower clamp member 300 thus eliminating any play which would permits the upper and lower clamp members 302, 304 to move relative to one another.

Figure 11:
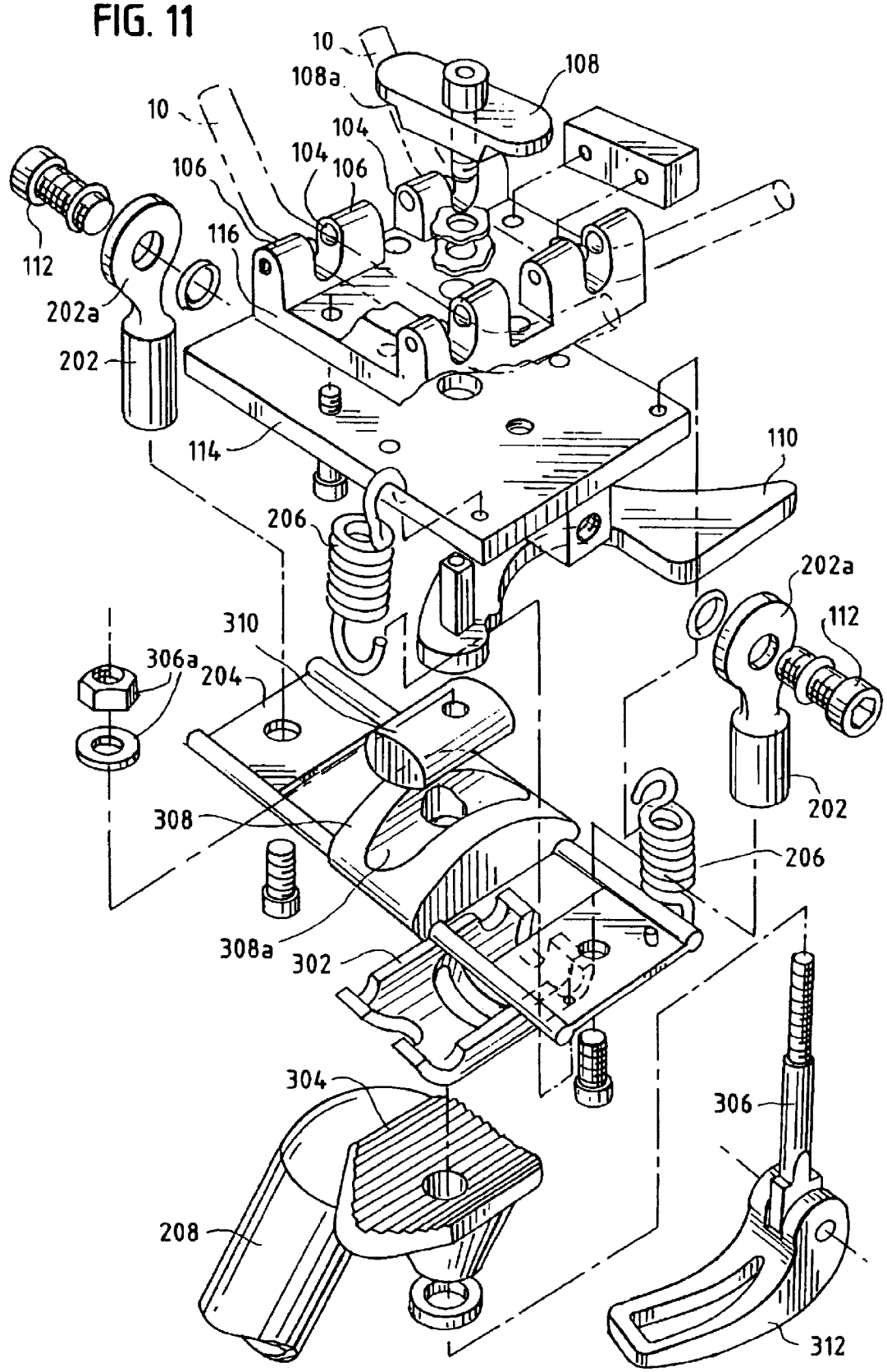
FIG. 11 is an exploded perspective view of the embodiment of the invention.

As will be appreciated from FIG. 11, this clamp arrangement is such as to allow the pitch of the saddle to be adjusted in accordance with the preference of the rider.

It will be understood that the invention is not limited to the clamp structure which is shown in the drawings and that modifications may be made thereto without departing from the scope of the invention. For example, alternative clamp elements/parts such as those described in U.S. Pat. No. 5,979,978 issued on Nov. 9, 1999, in the name of Olsen et al. may also be used if so desired. It will be noted, however, that it is advantageous that the cam lever at one end of the bolt, which is used to clamp the adjustment permitting arrangements together, be provided to enable quick and easy adjustment as one rider changes and another takes his or her place.

Figure 2:
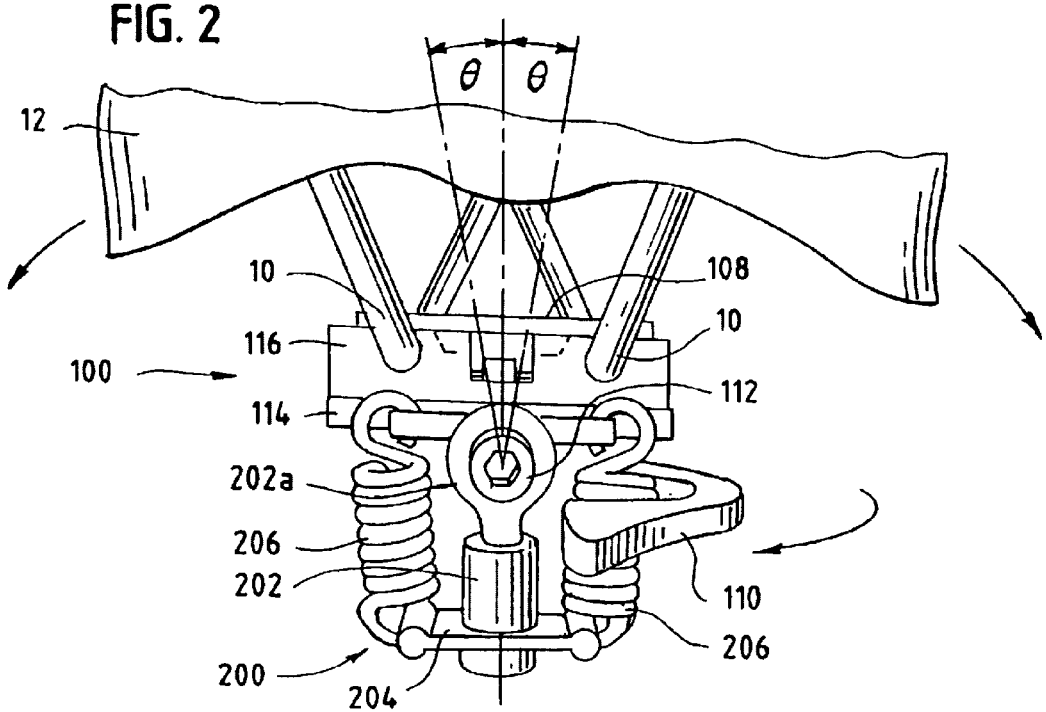
FIG. 2 is a view similar to that shown in FIG. 1, which depicts a release/clamp lever which is associated with a quick release/lock arrangement that enables a seat or saddle to be a swapped out, moved from an unlocked position illustrated in FIG. 1 to a locking position.
Figure 3:
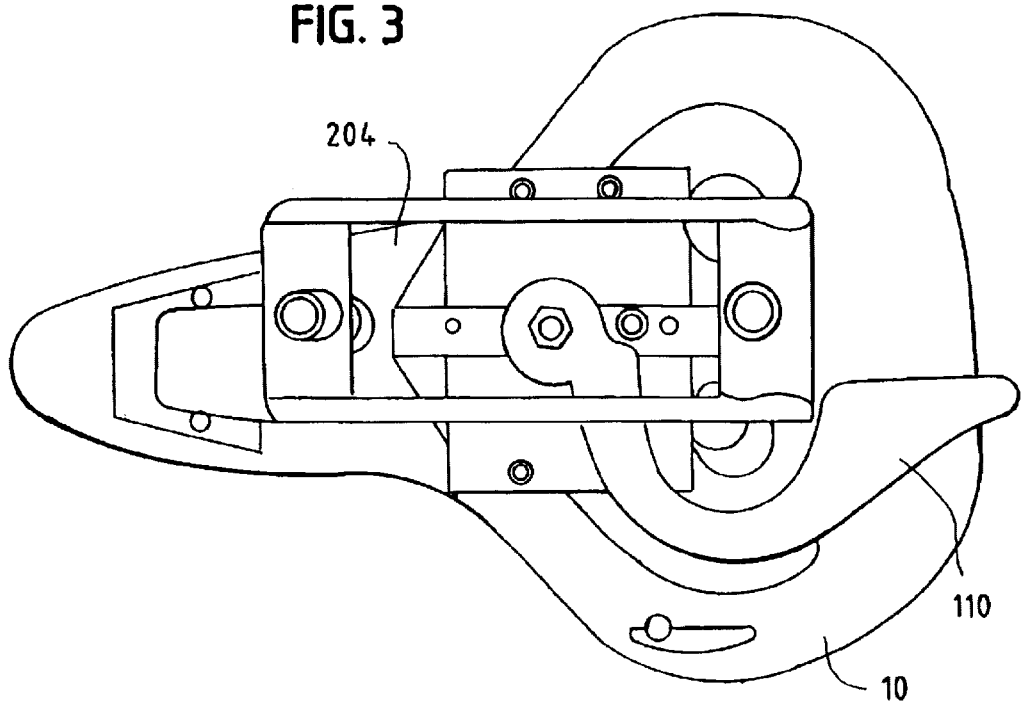
FIG. 3 is an underside view of a portion of the support platform which has been disconnected from the clamp arrangement so as to facilitate a ready understanding of the structure and arrangement of the release/clamp lever.
Figure 4:
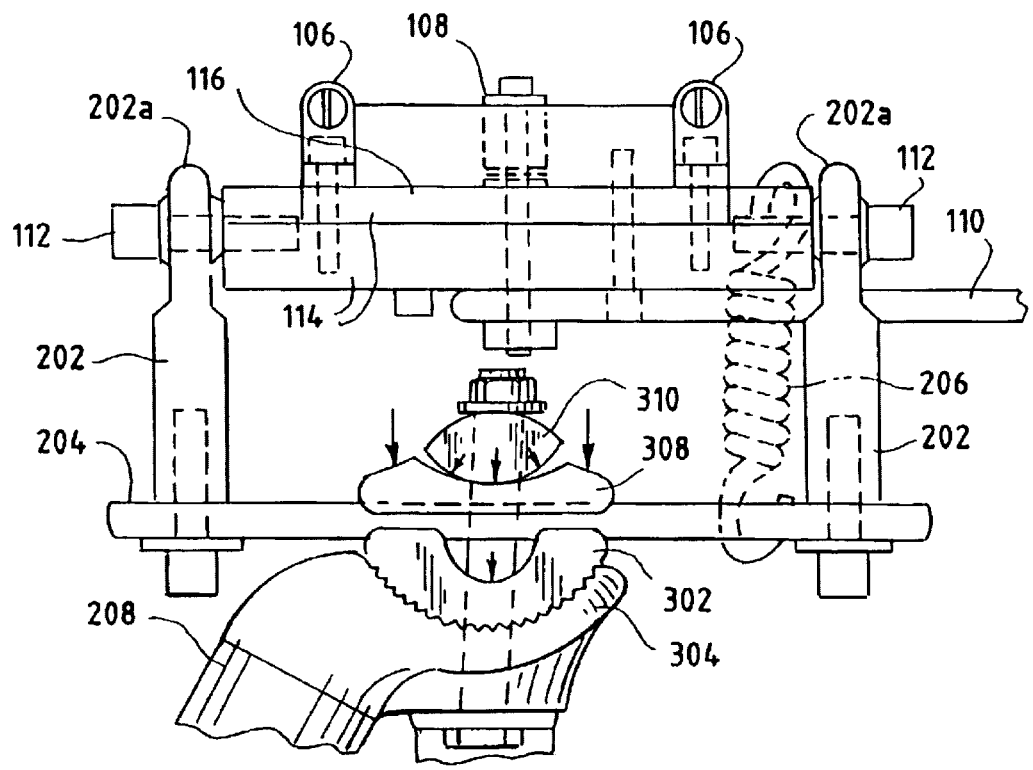
FIG. 4 is a side view showing details of the clamping arrangement which permits the orientation of the seat support platform with respect to the horizontal to be adjusted.
Figure 5:
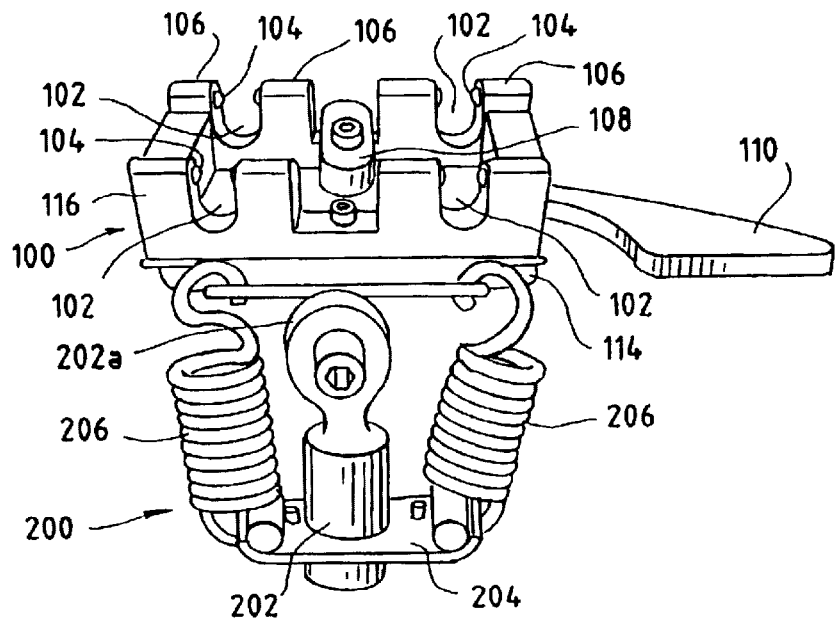
FIGS. 5 and 6 are perspective views which show a locking element, which is mounted on the seat support platform and forms a vital part of the quick release mechanism that enables the seat/saddle to be swapped out, in releasing and locking positions respectively.
Figure 6:
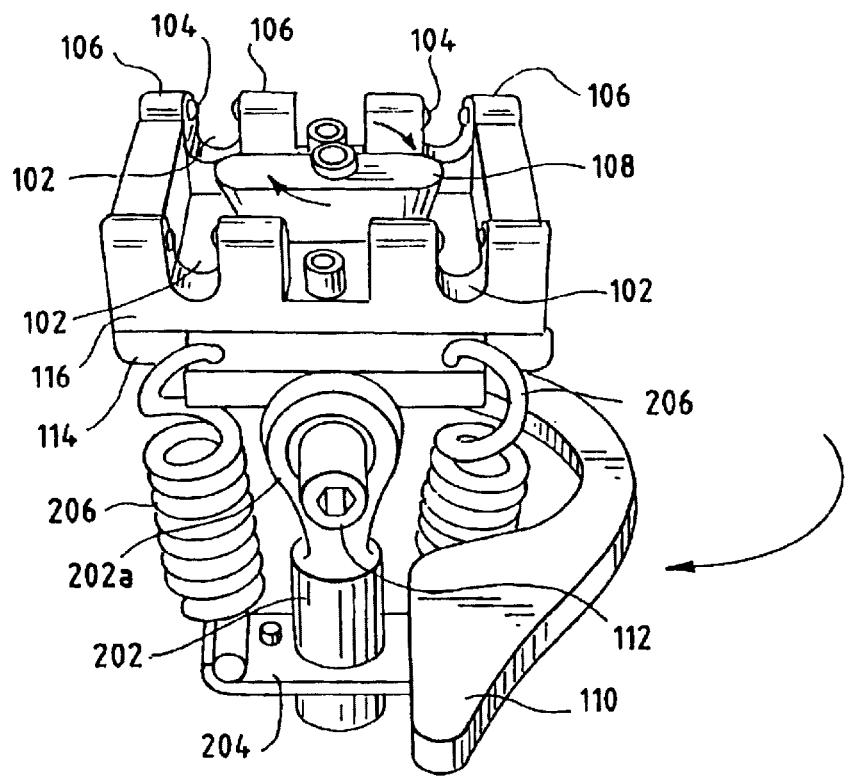
Figure 7:
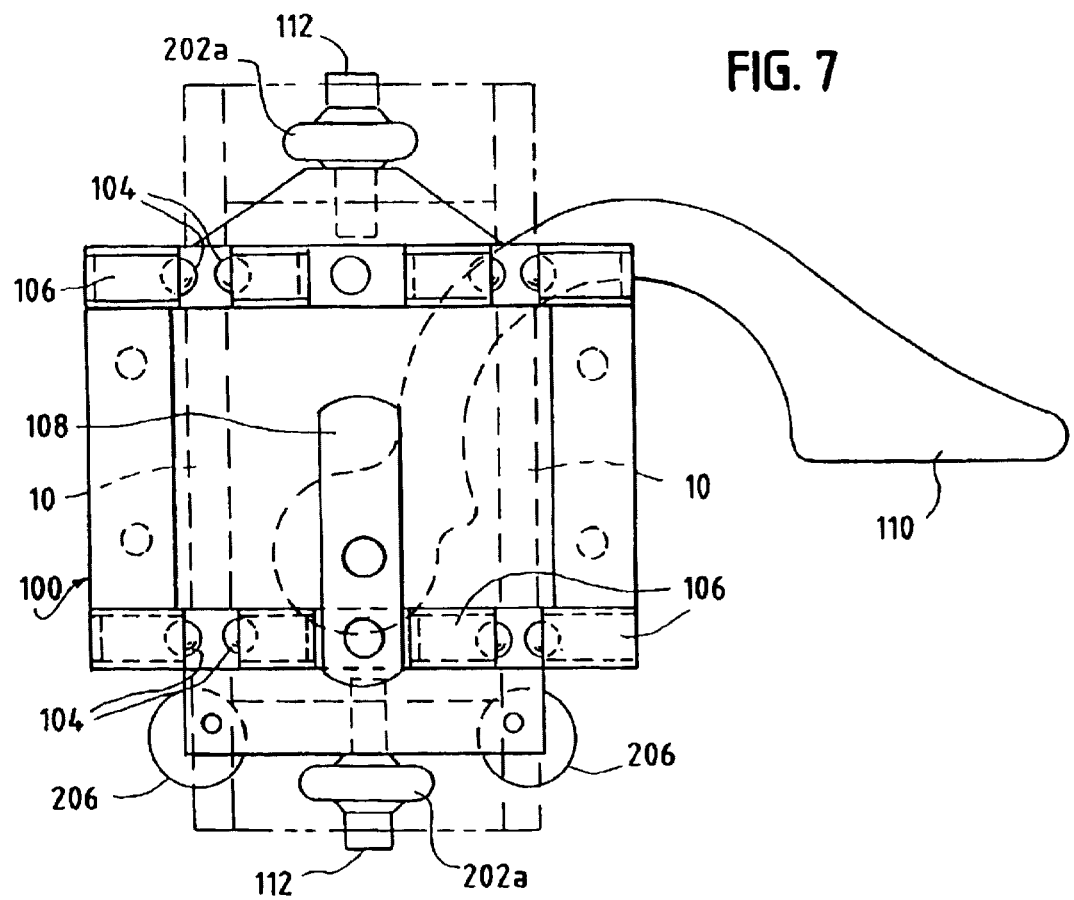
FIGS. 7 and 8 are respectively top plan and rear end views of the seat support platform showing the locking element and associated release/clamp or locking lever in their respective unlocked positions.
Figure 8:
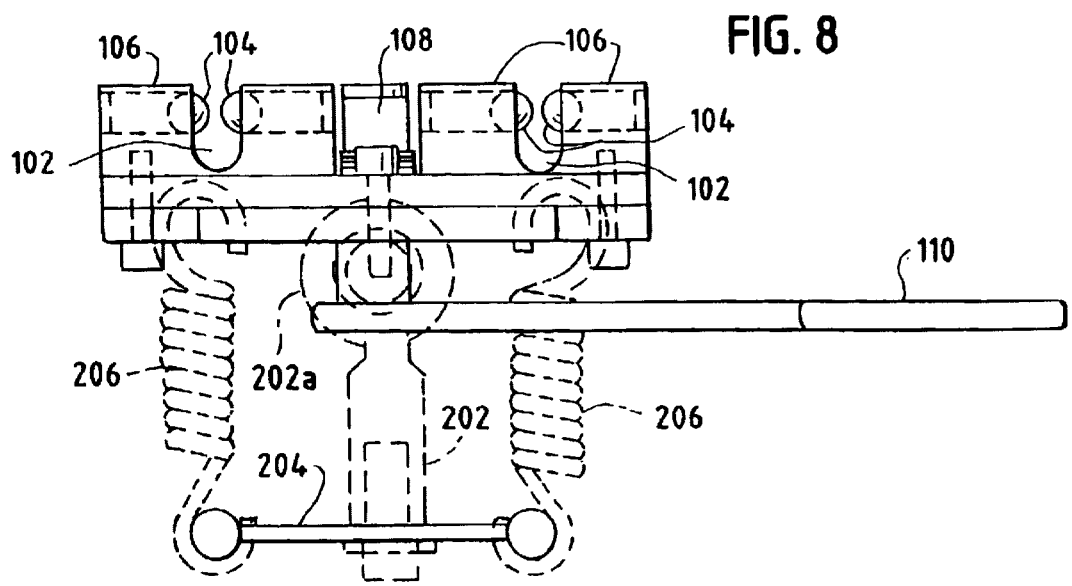
Figure 9:
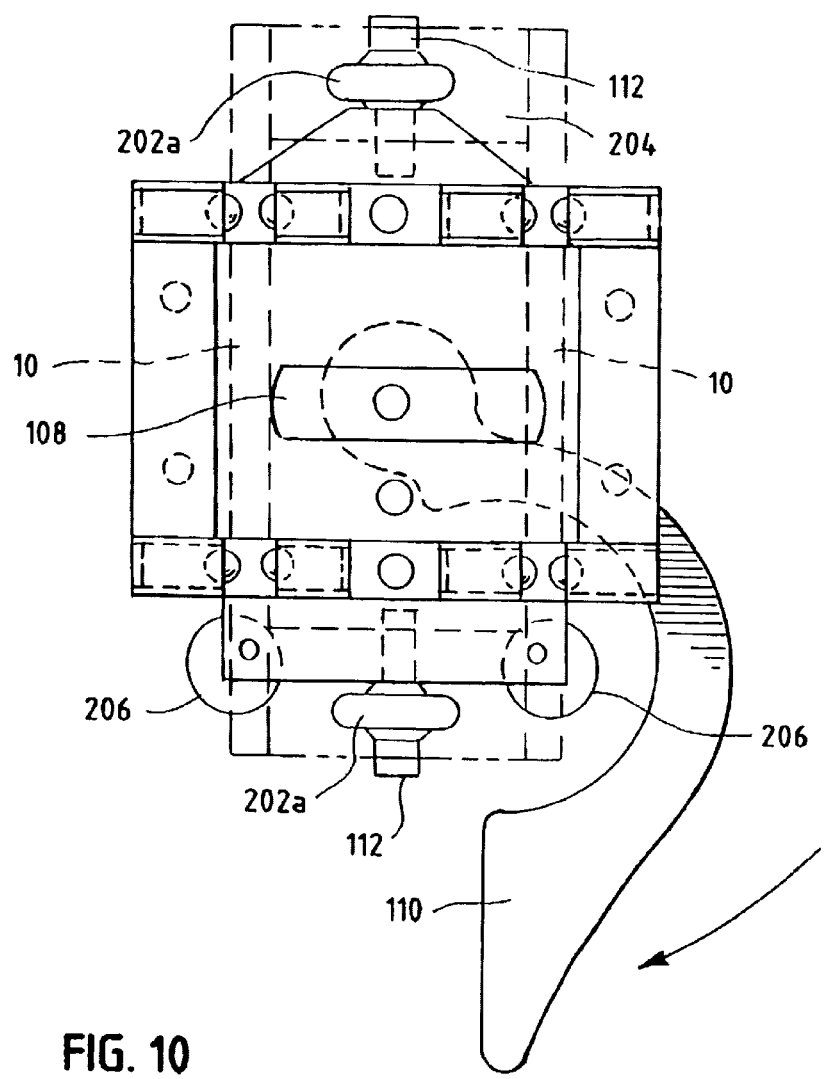
FIGS. 9 and 10 are respectively top plan and front end views of the seat support platform showing the locking element and associated release/clamp lever in their respective locked positions.
Figure 10:
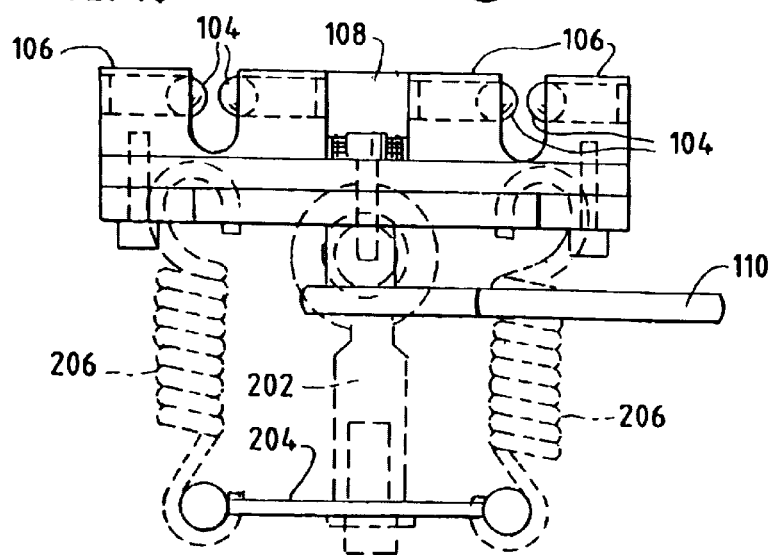

The operation of the above-described embodiment is such that when it is required to remove one saddle and replace it with another, the lock lever 110 is rotated form the position illustrated in FIGS. 2, 3 and 6 to that shown in FIGS. 5, 7 and 8. This rotates the lock-block 108 from the engaging locking position to the release position. Under these conditions, only the effect of the detents 104 resist removal of the seat frame portions 10 from the channels 102. A small force is sufficient to detach the saddle from its seated position. The new saddle or seat 12 may then be placed in position wherein the detents 104 will conveniently hold the saddle 12 in position until such time as the operator rotates the lock lever 110 back to its locking position whereby the lock-block 108 is brought into locking engagement with the upper surfaces of the saddle frame members 10.

Before mounting and using the newly placed saddle, it is possible for the user to adjust the pitch of the saddle 12 by rotating the cam lever 312 from the locking position shown in solid line in FIG. 1, to that shown in broken line. At this time, sufficient play is enabled between the upper and lower clamp members 302, 304 to permit disengagement of the teeth/splines and for the relative positions of the upper and lower members to be changed via manual manipulation of the saddle with respect to the bike frame, to achieve the desired angle. Rotation of the cam lever 312 back to its locking position forces the upper and lower clamp members 302, 304 back into slip-free engagement with one another and assures the rider that the saddle will remain in the selected position.

Upon mounting and using the stationary bike or the like type of device the new saddle or seat 12 has been connected to, the provision of the pivot bolts 112 and the springs 206 allow the seat support platform 100 and the attached saddle or seat 12 to rock from side to side in the manner depicted in FIG. 2 of the drawings. This provides the rider with the sensation of being on an actual bicycle wherein it leans from side to side as he or she makes powerful peddling strokes.

While the invention has been described with reference to only a limited number of embodiments, it will be appreciated that, given the preceding disclosure and knowledge of the principles upon which the invention is based, be able to make various changes and modifications without departing from the scope of the invention which is limited only by the appended claims.

What is claimed is:

1. A mounting arrangement for mounting on a stationary bicycle chassis a variety of seats each having a pair of parallel frame members, comprising:

a base member having a clamp operatively interconnecting said base member and the bicycle chassis;

a horizontally disposed seat-receiving platform supported on the base member;

the platform having on a top surface a pair of front and a pair of rear upstanding projection members for receiving the pair of parallel frame members to properly align and secure the seat on the platform;

at least two of the projection members including detents for retaining releasably the pair of parallel frame members within the projection members;

the platform further having a pair of parallel channels formed on the upper surface thereof and extending between the front and rear projection members, said channels adapted for receiving the pair of parallel frame members;

an elongated lock block having a pair of latching curved recesses at opposite, distal ends thereof and rotatably mounted on the platform, said lock block being movable between a first position wherein the seat can be readily removed from the platform to enable another seat to be secured quickly in place, and a second position wherein the pair of latching curved recesses secure intermediate portions of the pair of parallel frame members;

the lock block having a length less than the distance between the pair of front and the pair of rear projecting members;

a rotatably mounted lock lever for enabling the lock block to be rotated;

front and rear post members pivotally supporting the platform above the base member at opposite ends thereof, the upper ends of the post members being pivotally attached to the platform to enable the platform to tilt laterally from side to side when the seat is being used;

a pair of compression springs flanking the rear post member to bias resiliently the platform into a generally parallel disposition relative to the base member, each spring extending between the platform and the base member.

2. A mounting arrangement according to claim 1, wherein said clamp includes a first clamp member which is rigidly connected to the base member and a second clamp member which is rigidly connected with the chassis; and a cam arrangement for normally forcing the first and second clamp members into locking engagement with each other and for selectively permitting sufficient play between the first and second clamp members to allow relative movement therebetween.

3. A mounting arrangement according to claim 1, wherein the pair of parallel channels of the platform accommodate the seat.

* * * * *